May 8, 1951  A. H. SEIFTS  2,552,223
POWER ACTUATED GLIDER EQUIPPED WITH A SAFETY DEVICE
Filed July 16, 1948  3 Sheets-Sheet 1

INVENTOR
*Arthur H. Seifts*
BY
*Benjamin Sweedler*
ATTORNEYS

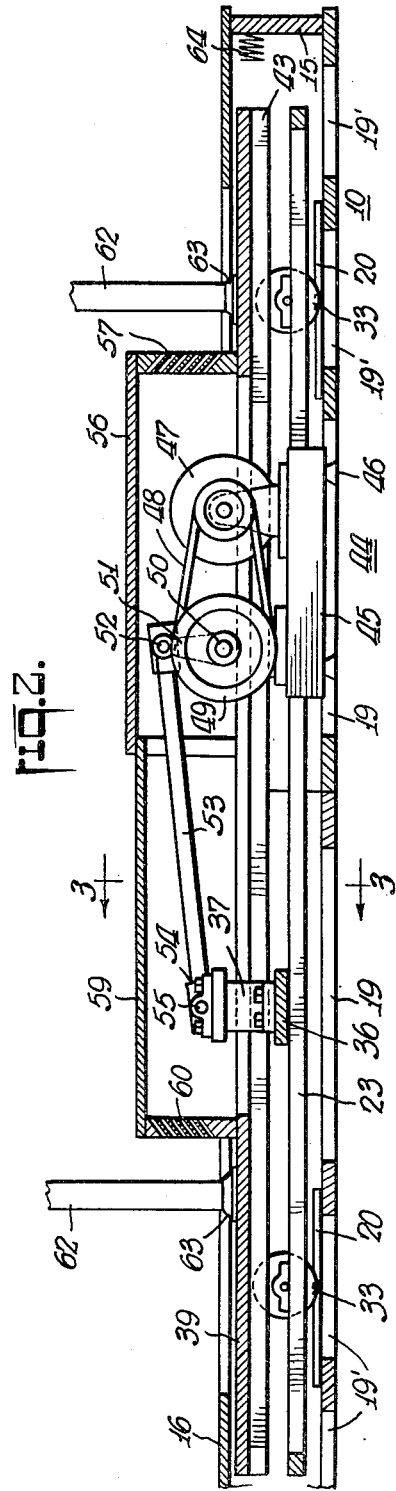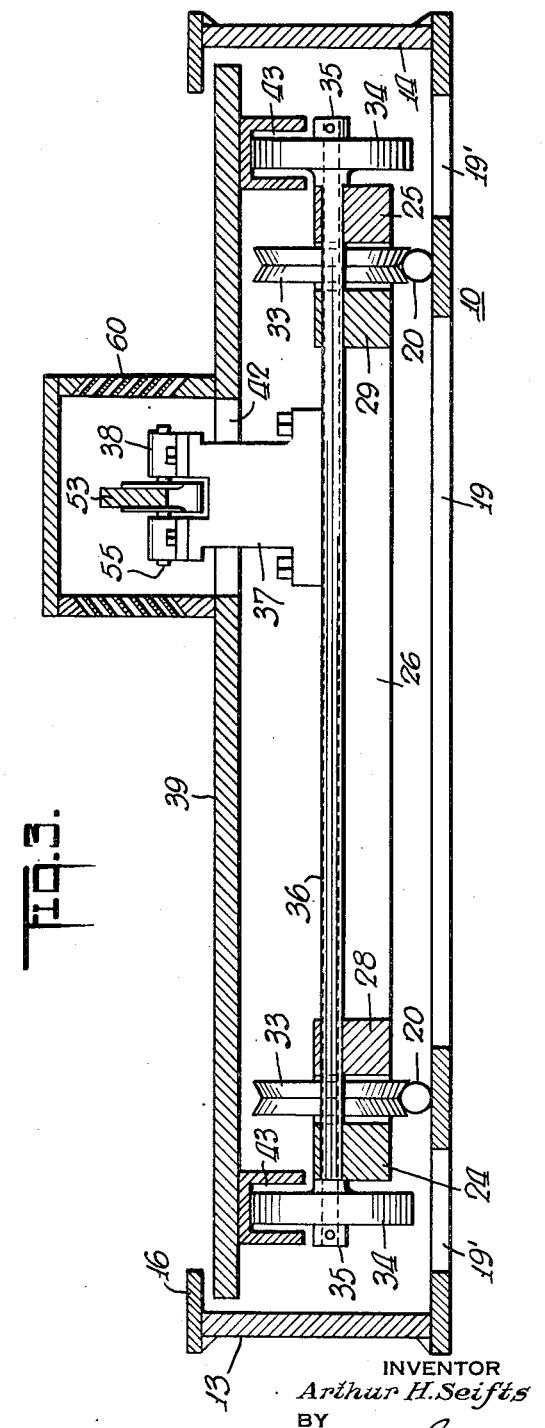

May 8, 1951     A. H. SEIFTS     2,552,223
POWER ACTUATED GLIDER EQUIPPED WITH A SAFETY DEVICE
Filed July 16, 1948     3 Sheets-Sheet 3
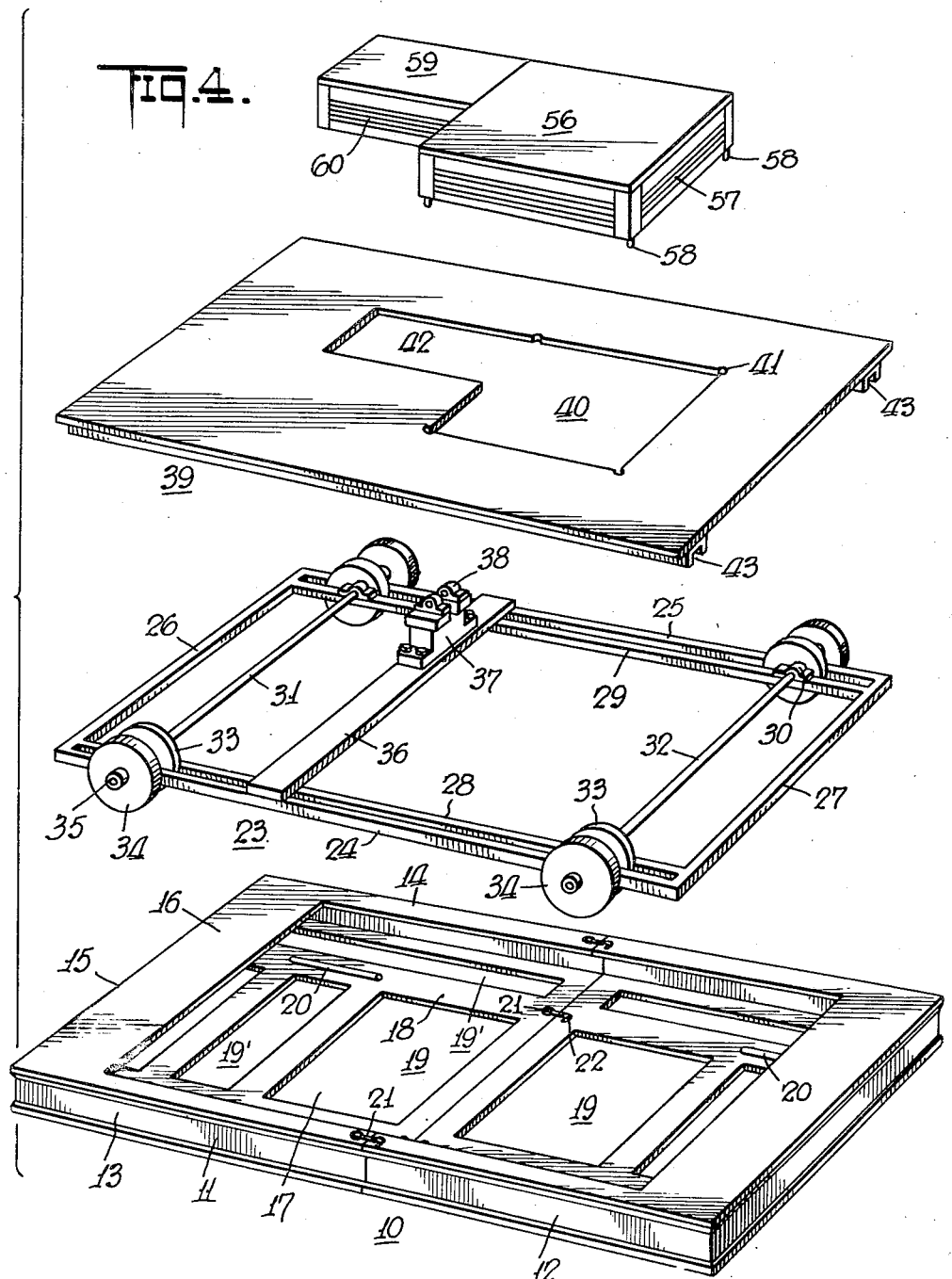
INVENTOR
Arthur H. Seifts
BY
Benjamin Sweedler
ATTORNEYS Patented May 8, 1951

2,552,223

UNITED STATES PATENT OFFICE 2,552,223

POWER ACTUATED GLIDER EQUIPPED WITH A SAFETY DEVICE

Arthur H. Seifts, West Hempstead, N. Y., assignor of one-third to Jack H. Nadler, New York, and one-third to Parker R. Hamlin, West Hempstead, N. Y.

Application July 16, 1948, Serial No. 39,085

6 Claims. (Cl. 5—109)

This invention relates to power-driven gliders on the supporting surface of which a crib, baby carriage, couch, chair or other member may be mounted to impart a pleasing gliding or rocking motion thereto, and more particularly to such power-driven gliders equipped with a safety mechanism to prevent injury to any impediment to the normal movement of the glider and also to prevent damage to the glider.

Power-driven gliders for reciprocating or rocking a crib, baby carriage, or other such member are known. One important field of use of such gliders is for rocking infants and small children's cribs or baby carriages to induce sleep. However, to the best of my knowledge and belief, such gliders have met with little commercial success in this field of use, principally because of the danger of injury to other children presented by such power-driven gliders, which, as heretofore constructed and designed, were not equipped with safety mechanism to prevent injury to the glider, and what is more important to a child or other person or object which might accidentally or otherwise come into the path of the movement of the glider.

An object of this invention is to provide a power-driven glider equipped with a sensitive safety device such that if a child or other object comes into the path of movement of the supporting surface of the glider or the crib, baby carriage or other object resting thereon, such supporting surface, crib, baby carriage, or other object comes to rest without injury to the child or other object impeding such movement and also without injury to such supporting surface, crib or baby carriage.

Another object of this invention is to provide such a glider which is simple in design, economical to construct and operate, and desirably is of sectional construction, the parts occupying little space in storage, being readily movable from place to place and assembled at any desired point of use.

Other objects and advantages of this invention will be apparent from the following detailed description thereof.

In the preferred embodiment illustrated on the drawings the invention is shown incorporated in a glider, the supporting surface of which has mounted thereon a crib, and the present description will be confined to the present illustrated embodiment of the invention. It will be understood, however, that the novel features and improvements are susceptible of other applications, such, for example, as gliders having a supporting surface on which a chair, baby carriage, couch, or other member may be mounted. Hence, the scope of this invention is not confined to the embodiment herein described. The term "glider" is used herein in a broad sense, and is intended to include any member to which a gliding or reciprocatory motion is imparted.

In the accompanying drawings forming a part of this specification and showing for purposes of exemplification a preferred form of this invention without limiting the invention to such illustrative instance, Figure 1 is a perspective view of a crib glider embodying my invention;

Figure 2 is a fragmentary vertical section taken in a plane passing through line 2—2 of Figure 1;

Figure 3 is a vertical section taken in a plane passing through line 3—3 of Figure 2; and Figure 4 is a perspective view of each of the important component parts of the glider showing in the order named from bottom to top of this figure (1) the box-like frame-base, (2) the reciprocatory frame, (3) the supporting member, and (4) the casing for the power unit and actuating mechanism.

Figure 1:
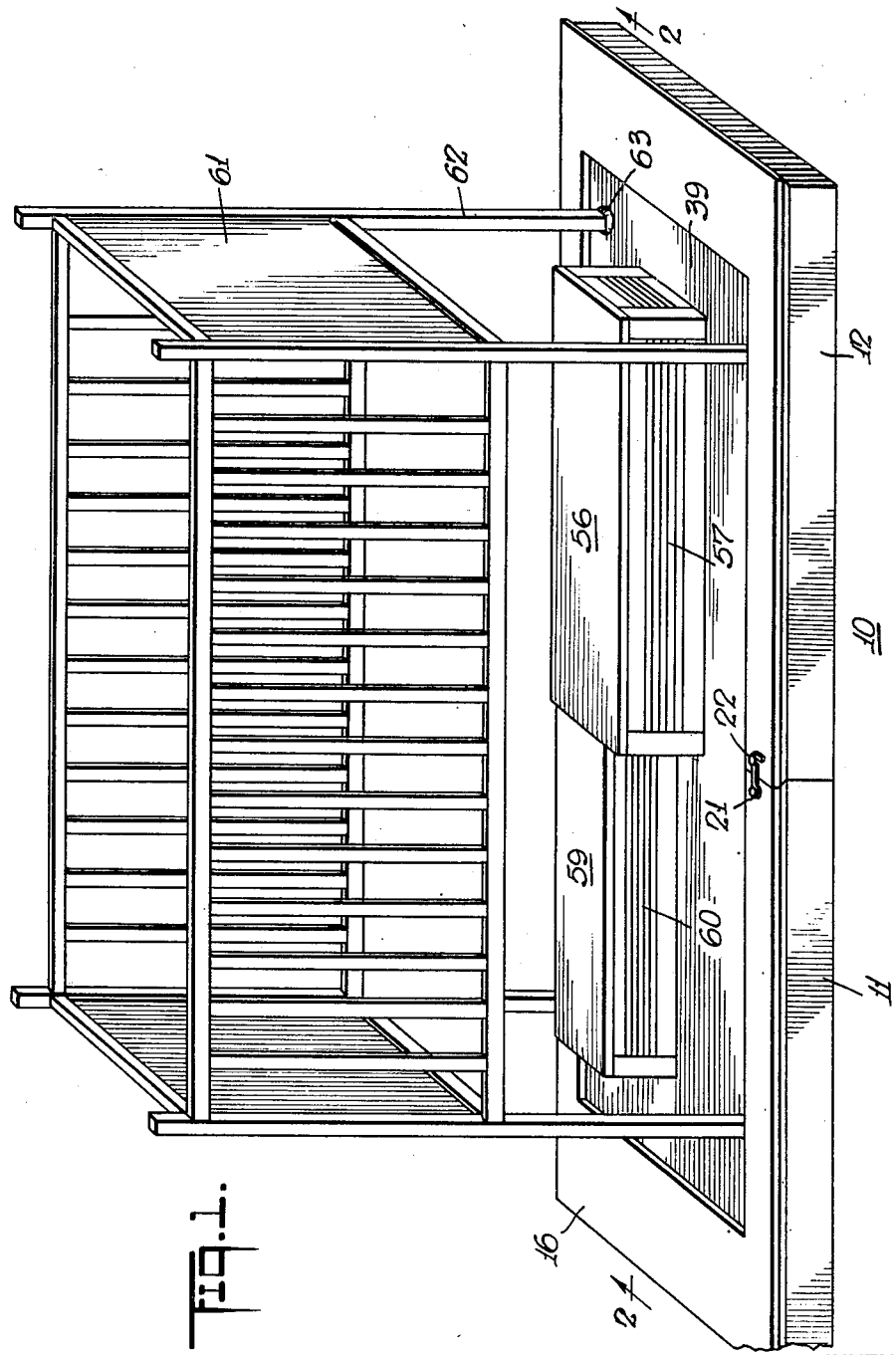

In the drawings 10 indicates a supporting base desirably in the form of a box-like frame formed of two like sections 11 and 12 for ease of manufacture. Each section is composed of sides 13, 14, closed end 15, a removable top 16 defining a large rectangular opening 17 and a base 18. Desirably base 18 is formed with a large rectangular opening 19 and smaller openings 19' which lighten the base. Base 18 has mounted on the sides thereof tracks or rails 20, two such tracks or rails being provided in each section, as shown in Figure 3, each such track or rail being of a length to accommodate the desired reciprocatory or gliding movement of the glider. Rails 20 may be a metal cable circular in cross section, as shown in Figure 3, or of conventional rail construction.

The sections 11 and 12 are adapted to be placed in abutting relationship, as shown in Figure 4, and locked in place by suitable pivoted hooks 21 on one section, say section 11, engaging suitable pins 22 on the other section. There is thus produced a box-like supporting frame having an open top provided with two sets of parallel rails 20 on its base.

A wheeled frame 23 consists of side pieces 24, 25 joined by transverse end members 26, 27 defining a rectangular frame. Bearing supporting members 28, 29 parallel to side members 24, 25, respectively, are spaced from these side members and have their ends suitably fastened to the end members 26, 27. Journaled in bearings 30 mounted on the bearing members 28, 29 is a pair of shafts 31, 32, which shafts extend across the wheeled frame 23 near the ends thereof, as shown in Figure 4. Wheels 33 are mounted on these shafts in the spaces between bearing members 28, 29 and side members 24, 25, respectively, as shown in Figure 4. These wheels travel on tracks 20 when frame 23 is disposed within box-like base 10 and support frame 23 for reciprocatory motion on tracks 20.

Shafts 31, 32 extend beyond the side members 24, 25 of the frame 23 and have idler wheels 34 mounted for rotation on these extensions. Four such idler wheels are shown near each of the corners of the wheeled frame 23 in the embodiment of the invention shown in the drawings. These idler wheels preferably are of rubber synthetic or natural. Each idler wheel is maintained on its shaft 31 or 32 by means of a collar 35 suitably fastened to the shaft and permitting free rotation of the idler wheel 34 on the shaft. A cross piece 36 is suitably fastened to the side pieces 24, 25 of frame 23 and has mounted thereon a cross head 37 to which is secured a bearing member 38, the function of which will be hereinafter described.

As shown in Figures 2 and 3, wheeled frame 23 is positioned within the box-like frame 10 with the wheels 33 riding on the tracks 20 and the idler wheels 34 extending laterally from the sides of frame 23, the wheeled frame being positioned well below the top of the box-like frame 10.

A supporting member 39 desirably in the form of a flat platform has a central opening 40 of rectangular shape provided at each of its corners with a circular opening 41 and an oblongular opening 42 leading into opening 40. The underside of supporting member 39 is provided near its sides with tracks 43 each of inverted U-shape in cross section. Supporting member 39 is adapted to rest on the wheeled frame 23 with the idler wheels 34 disposed within the tracks 43, as shown in Figure 3. Thus the weight of supporting member 39 is carried by the idler wheels 34 mounted on the wheeled frame 23. The upper surface of supporting member 39 is disposed just below the top of the box-like frame 10, as is evident from Figures 2 and 3.

A power unit 44 consists, for example, of a base 45 having suction cups 46 on its underside. Mounted on the base 45 is a motor, preferably an electric motor 47, suitably bolted or otherwise secured to the base 45. This motor through a belt drive 48 drives a speed reducer 49 of any conventional type which is also suitably mounted on base 45. In the embodiment shown in Figure 2 of the drawings, speed reducer 49 comprises a driven shaft 50 having secured thereto one end of a crank 51, the other end of which is pivotally fastened as at 52 to one end of connecting rod 53. The other end 54 of connecting rod 53 is pivotally secured to a crank pin 55 mounted in bearing 38 which, as hereinabove described, is secured to the top of cross head 37.

A hood 56 provided with ventilating louvers 57 in the sides and end thereof has pins 58 disposed at each of the four corners. These pins fit within the circular openings 41 at the corners of rectangular opening 40 in supporting member 39. The hood 56 is thus firmly held in place covering the power unit 44. A second narrower hood 59 provided with ventilating louvers 60 is in like or other manner secured over the elongated opening 42, the second hood fitting within the first-mentioned hood and both completely enclosing the power unit and the connecting rod 53 and cross head 37. These hoods act as a shield to prevent a child or other person from contacting the actuating mechanism of the glider.

A crib 61, which may be of any desired type, preferably has on the legs 62 thereof, suction cups 63 which rest on the supporting member 39 and thus firmly maintain the crib in its position on its supporting member. The crib, of course, could be bolted or mounted in any other manner on supporting member 39.

It will be noted the glider of this invention involves (1) a sectional box-like frame-base 10 composed of two like sections 11 and 12 so that they can be easily and relatively inexpensively fabricated and assembled to produce the base 10, (2) a wheeled movable frame 23, which is readily mounted for movement on the tracks 20, (3) a supporting member 39 which is disposed to rest on the idler wheels 34, the assembly of wheeled frame 23 and supporting member 39 being disposed within the box-like frame 10 with the top of the supporting member 39 at a level just below the top of box-like frame 10, (4) a power unit 44 readily positioned on the floor or other surface on which the glider may be disposed, this power unit passing through the aligned openings 40 in the supporting member 39, the open frame 23 and one of the openings 19 in the box-like base 10 and being readily connected through the connecting rod 53 with the cross head 37 of the wheeled frame 23 to impart reciprocatory motion thereto, and (5) a hood for covering the power unit 44 and the mechanism actuated by this power unit. Hence, the glider can readily be assembled or disassembled, the parts thereof removed to any desired location and again assembled and placed in operative condition.

To assemble the glider it is only necessary to combine the two sections 11 and 12 of the box-like frame 10 by means of pivoted hooks 21 engaging pins 22 to form the box-like frame 10, then place the wheeled frame 23 within box-like frame 10 with wheels 33 riding on tracks 20, place supporting member 39 so that the idler wheels 34 travel in tracks 43 on the underside of supporting member 39, place the power unit 44 through the aligned openings hereinabove described, so that it rests on the floor or other supporting surface on which the box-like frame 10 is disposed, connect the connecting rod 53 with crank 51 and the connecting pin in the bearing 38 on cross head 37, thereafter apply the hoods 56, 59 to cover the driving units and the mechanism actuated thereby, and finally place the crib in position on the supporting surface 39.

Once the parts are assembled, as hereinabove described, it is only necessary to energize the motor 47 which through the speed reducer 49, crank 51, connecting rod 53 and cross head 37 effects reciprocatory motion of the wheeled frame 23 on tracks 20. Supporting member 39 moves with frame 23, the weight of this supporting member and the crib or other object mounted thereon causing it to move with the reciprocatory frame 23 as long as no impediment is encountered to the movement of the supporting member or of the crib thereon. Movement of supporting member 39 towards the end of its path of movement is cushioned by bumper springs 64 (Figure 2) suitably mounted on the ends 15 of the box-like base 10.

Should any impediment be interposed to the movement of the supporting member 39, for example, should a child step on the box-like base 10 so that he or she is in the path of movement of the crib, as soon as the crib contacts the child, movement of the crib and of the supporting member 39 ceases, the idler wheels 34 being caused to rotate in the tracks 43 as the wheeled frame continues the movement imparted to it by the drive hereinabove described. Thus, the mounting of the supporting member 39 on the idler wheels 34 constitute a lost motion connection which permits the frame 23 to be moved by the actuating mechanism therefor hereinabove described without moving the supporting member 39 and the crib thereon. When the wheeled frame 23 is moved in a reverse direction by the succeeding stroke of connecting rod 53, in which direction there is no impediment to the movement of the supporting member 39 or to the crib thereon, then the supporting member 39 again moves with the frame 23. Should there be any impediment to the movement of supporting member 39 or crib 61 in this reverse direction they come to rest while the wheeled frame 23 moves as hereinabove described. In operation the safety mechanism herein described has been found so sensitive that if a hand be lightly placed on the crib mounted on supporting member 39, or on supporting member 39, to exert a small force in opposition to the direction of movement of the supporting member, movement thereof immediately ceases, the frame 23 continuing in its movement.

The glider parts may be made of wood, metal, or other suitable materials of construction; as above indicated idler wheels 34 preferably are of rubber or a rubber-like plastic material.

It will be noted this invention provides a power-driven glider equipped with a sensitive safety device preventing injury to a child or other object which may come into the path of movement of the supporting surface of the glider, or of the crib or other member mounted thereon. Also this invention provides a glider which is simple in design, economical to construct and operate, the parts of which occupy little space in storage, are readily moved from place to place and can easily be assembled at any desired place of use.

Since different embodiments of the invention could be made without departing from the scope of this invention, it is intended that all matter contained in the above description or shown in the accompanying drawings shall be interpreted as illustrative and not in a limiting sense.

What is claimed is:

1. A glider comprising, in combination, a base, a frame mounted for movement on said base, means for moving said frame, idler rolls on said frame, and a supporting member resting on said idler rolls in frictional contact therewith and thus normally movable with said frame, said idler rolls being mounted on said frame for free rotation thus constituting a lost motion connection between said supporting member and said frame preventing said supporting member from moving with said frame when movement of said supporting member is impeded.

2. A glider comprising, in combination, a base, a wheeled reciprocating frame mounted for reciprocatory motion on said base, means for reciprocating said frame, idler rolls on said frame, and a supporting member resting on said idler rolls and thus normally movable with said frame, said idler rolls being mounted on said frame for free rotation thus constituting a lost motion friction connection between said frame and said supporting member preventing said supporting member from moving with said frame when movement of said supporting member is impeded.

3. A glider comprising, in combination, a base, a frame mounted for movement on said base, means for moving said frame, idler rolls mounted on said frame for free rotation and a supporting member having tracks on its underside resting on said frame with the idler rolls disposed in said tracks on the underside of said supporting member and normally non-rotatable in said tracks, said idler rolls being rotated in said tracks when movement of said supporting member is impeded.

4. A glider comprising, in combination, a base provided with tracks, a wheeled reciprocating frame mounted for reciprocatory motion on said base with the wheels of said frame travelling on said tracks, means for reciprocating said frame, idler rolls on said frame, a supporting member having tracks on its underside resting on said frame with the idler rolls disposed in said tracks on the underside of said supporting member, said supporting member being normally movable with said frame and when movement of said supporting member is impeded said supporting member being brought to rest and said idler rolls caused to rotate by movement of said frame and the frictional contact between said idler rolls and said tracks on the underside of said supporting member in which tracks said idler rolls travel.

5. In a glider, a rectangular box-like frame comprising a floor portion, enclosed sides and ends and an open top, tracks on said floor portion near the sides thereof, a wheeled frame disposed within said box-like frame with the wheels thereof travelling on said tracks, idler rolls mounted on the sides of said wheeled frame, a supporting member having tracks on its underside in which tracks said idler rolls are disposed, the weight of said supporting member being carried by said idler rolls so that said supporting member is movable with said wheeled frame, said supporting member being disposed within said box-like frame with its top at a level just below the level of the open top of said box-like frame, a motor disposed within said box-like frame and fixed relative to said box-like frame, and driving connections between said motor and said wheeled frame.

6. In a glider, a rectangular box-like frame comprising a floor portion, enclosed sides and ends and an open top composed of two like sections which when placed end to end form said frame, tracks on said floor portion near the sides thereof, a wheeled reciprocating frame disposed within said box-like frame with the wheels thereof travelling on said tracks, idler rolls mounted on the sides of said wheeled frame, a supporting member having its central portion open and tracks on its underside in which tracks said idler rolls are disposed, the weight of said supporting member being carried by said idler rolls so that said supporting member is movable with said wheeled frame, said supporting member being disposed within said box-like frame with its top at a level just below the level of the open top of said box-like frame, a motor disposed within the central open portion of said supporting member and within said box-like frame and fixed relative to said box-like frame, driving connections between said motor and said wheeled frame, and a casing enclosing said motor and driving connections and removably mounted to cover the said central open portion of said supporting member.

ARTHUR H. SEIFTS.

REFERENCES CITED

The following references are of record in the file of this patent:

UNITED STATES PATENTS

| Number | Name | Date |
|---|---|---|
| 1,795,246 | Brown | Mar. 3, 1931 |
| 1,924,493 | Grunkemeyer | Aug. 29, 1933 |